(12) United States Patent
Ohsugi

(10) Patent No.: US 10,728,404 B2
(45) Date of Patent: Jul. 28, 2020

(54) JOB COMPLETION NOTIFICATION APPARATUS, MULTIFUNCTION PRINTER, AND JOB COMPLETION NOTIFICATION METHOD

(71) Applicant: SHARP KABUSHIKI KAISHA, Sakai, Osaka (JP)

(72) Inventor: Jitsui Ohsugi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/250,266

(22) Filed: Jan. 17, 2019

(65) Prior Publication Data
US 2019/0230236 A1    Jul. 25, 2019

(30) Foreign Application Priority Data
Jan. 24, 2018   (JP) ................................ 2018-009484

(51) Int. Cl.
*H04N 1/00*   (2006.01)
*G06F 3/12*   (2006.01)

(52) U.S. Cl.
CPC ....... *H04N 1/00488* (2013.01); *G06F 3/1207* (2013.01); *G06F 3/1259* (2013.01); *G06F 3/1284* (2013.01); *G06F 3/1285* (2013.01); *H04N 2201/0094* (2013.01)

(58) Field of Classification Search
None
See application file for complete search history.

(56) References Cited

U.S. PATENT DOCUMENTS

2007/0211279 A1* 9/2007 Podl ...................... G06F 3/1207
                                                              358/1.15
2017/0223199 A1* 8/2017 Maeda .................. G06F 3/1206

FOREIGN PATENT DOCUMENTS

JP         2011-180481 A      9/2011

* cited by examiner

*Primary Examiner* — Andrew H Lam
(74) *Attorney, Agent, or Firm* — ScienBiziP, P.C.

(57) ABSTRACT

If a remote job is complete while a multifunction printer is executing an operator operation job, the multifunction printer performs a voice notification after a series of predetermined processes related to the operator operation job is complete. The voice notification indicates that the remote job is complete.

8 Claims, 8 Drawing Sheets

JOB COMPLETION NOTIFICATION APPARATUS, MULTIFUNCTION PRINTER, AND JOB COMPLETION NOTIFICATION METHOD

BACKGROUND

1. Field

The present disclosure relates to a job completion notification apparatus, a multifunction printer including the job completion notification apparatus, and a job completion notification method.

2. Description of the Related Art

Jobs executed by a multifunction printer include two types of jobs that are an operator operation job and a remote job.

The operator operation job is a job executed in accordance with the content of input performed by a user who is an operator on an operation unit included in a user interface provided to the multifunction printer. Simply speaking, the operator operation job is a job executed in response to input performed on the multifunction printer by the operator. For example, copying performed in response to the user's pressing of the copy button displayed on the user interface is an operator operation job. Facsimile transmission performed in response to the user's pressing of facsimile transmission buttons displayed on the user interface is an operator operation job.

The remote job is a job executed in response to a job request from an external apparatus connected to the multifunction printer via a network. For example, printing performed in response to a printing job request from a personal computer connected to the multifunction printer via the network is a remote job. Facsimile transmission performed in response to a facsimile transmission job request from the personal computer connected to the multifunction printer via the network is a remote job.

To date, there have been provided multifunction printers that execute a remote job such as printing in response to a request from an external apparatus such as a personal computer connected to a network and that notify a user of remote job completion with voice if the remote job is complete.

However, such multifunction printers have the following issues to be addressed.

Issue 1

Upon completion of the discharging of a printed sheet, Print Completion is generally notified with voice. Even while a user different from a user who requests a remote printing job is operating the operation panel to cause the multifunction printer to execute an operator operation job such as copying or scanning, Print Completion is notified with voice upon completion of the discharging. In this case, the voice notification is unnecessary for the user operating the operation panel. In addition, the user operating the operation panel hinders the user who causes the multifunction printer to perform printing through the remote printing job from taking out a printed sheet from a discharged-sheet stacker or the like.

FIG. 1 illustrates an example of time when a voice notification in Issue 1 above is performed.

Assume a case where while a user A is operating the operation panel of the multifunction printer for an operator operation job, a user B causes the multifunction printer to execute a remote job. In this case, when sheet discharging based on a remote job from the user B is complete, the multifunction printer performs a voice notification of the completion of printing. Accordingly, even while the user A is operating the operation panel, the voice notification for the user B is performed.

Issue 2

When a series of predetermined processes related to an operator operation job is complete, a voice notification is not generally performed. Assume a case where a first user intends to cause the multifunction printer to execute an operator operation job such as copying or scanning by directly operating the operation panel of the multifunction printer, but where a second user is directly operating the operation panel of the multifunction printer to execute an operator operation job. This case causes the first user to wait until a series of predetermined processes related to the operator operation job currently being executed is complete or to wait until operation related to the operator operation job ends. Typically, the first user checks the available state of the multifunction printer by visual observation.

Japanese Unexamined Patent Application Publication No. 2011-180481 discloses an embodiment in which a human sensor detects the location of a user to control voice guidance or sound volume; however, the issues described above are not addressed.

It is desirable to provide a multifunction printer and a job completion notification method that appropriately control when to perform a voice notification of operator operation job completion in accordance with the use condition of the multifunction printer.

SUMMARY

According to an aspect of the disclosure, there is provided a multifunction printer that executes an operator operation job and a remote job. The operator operation job is a job executed in response to input performed on the multifunction printer by an operator. The remote job is a job executed in response to a job request from an external apparatus connected to the multifunction printer via a network.

If the remote job is complete while the multifunction printer executing the operator operation job, the multifunction printer performs a voice notification after a series of predetermined processes related to the operator operation job is complete. The voice notification indicates that the remote job is complete.

In addition, according to an aspect of the disclosure, there is provided a multifunction printer that executes an operator operation job and a remote job. The operator operation job is a job executed in response to input performed on the multifunction printer by an operator. The remote job is a job executed in response to a job request from an external apparatus connected to the multifunction printer via a network.

If the remote job is complete while the multifunction printer is executing the operator operation job, the multifunction printer compares the operator corresponding to the operator operation job with a requester corresponding to the remote job and performs a voice notification indicating that the remote job is complete. The voice notification is performed immediately if the operator is identical to the requester. The voice notification is performed after a series of predetermined processes related to the operator operation job is complete if the operator is not identical to the requester.

Further, according to an aspect of the disclosure, there is provided a multifunction printer that executes an operator operation and a remote job. The operator operation job is a job executed in response to input performed on the multifunction printer by an operator. The remote job is a job executed in response to a job request from an external apparatus connected to the multifunction printer via a network.

If runtime of the operator operation job is longer than or equal to a predetermined time period, the multifunction printer performs a voice notification indicating that a series of predetermined processes related to the operator operation job is complete. The voice notification is performed when the series of predetermined processes related to the operator operation job is complete.

Further, according to an aspect of the disclosure, there is provided a multifunction printer that executes an operator operation job and a remote job. The operator operation job is a job executed in response to input performed on the multifunction printer by an operator. The remote job is a job executed in response to a job request from an external apparatus connected to the multifunction printer via a network.

If the multifunction printer receives, from the external apparatus, a request for a voice notification indicating that a series of predetermined processes related to the operator operation job is complete, the multifunction printer performs the voice notification indicating that the series of predetermined processes related to the operator operation job is complete. The voice notification is performed when the series of predetermined processes related to the operator operation job is complete.

Further, according to an aspect of the disclosure, there is provided a job completion notification method for a multifunction printer that executes an operator operation job and a remote job. The operator operation job is a job executed in response to input performed on the multifunction printer by an operator. The remote job is a job executed in response to a job request from an external apparatus connected to the multifunction printer via a network.

The method includes performing a voice notification if the remote job is complete while the multifunction printer is executing the operator operation job. The voice notification indicates that the remote job is complete. The voice notification is performed after a series of predetermined processes related to the operator operation job is complete.

Further, according to an aspect of the disclosure, there is provided a job completion notification method for a multifunction printer that executes an operator operation job and a remote job. The operator operation job is a job executed in response to input performed on the multifunction printer by an operator. The remote job is a job executed in response to a job request from an external apparatus connected to the multifunction printer via a network.

The method includes, if the remote job is complete while the multifunction printer is executing the operator operation job, comparing the operator corresponding to the operator operation job with a requester corresponding to the remote job and performing a voice notification indicating that the remote job is complete. The voice notification is performed immediately if the operator is identical to the requester. The voice notification is performed after a series of predetermined processes related to the operator operation job is complete if the operator is not identical to the requester.

Further, according to an aspect of the disclosure, there is provided a job completion notification method for a multifunction printer that executes an operator operation job and a remote job. The operator operation job is a job executed in response to input performed on the multifunction printer by an operator. The remote job is a job executed in response to a job request from an external apparatus connected to the multifunction printer via a network.

The method includes performing a voice notification if runtime of the operator operation job is longer than or equal to a predetermined time period. The voice notification indicates that a series of predetermined processes related to the operator operation job is complete. The voice notification is performed when the series of predetermined processes related to the operator operation job is complete.

Further, according to an aspect of the disclosure, there is provided a job completion notification method for a multifunction printer that executes an operator operation job and a remote job. The operator operation job is a job executed in response to input performed on the multifunction printer by an operator. The remote job is a job executed in response to a job request from an external apparatus connected to the multifunction printer via a network.

The method includes performing a voice notification if a request for the voice notification is received from the external apparatus. The voice notification indicates that a series of predetermined processes related to the operator operation job is complete. The voice notification is performed when the series of predetermined processes related to the operator operation job is complete.

Further, according to an aspect of the disclosure, there is provided a non-transitory computer readable medium storing a program causing a computer to function as the multifunction printer described above.

DESCRIPTION OF THE EMBODIMENTS

Hereinafter, an embodiment for implementing the disclosure will be described in detail with reference to the drawings.

According to this embodiment, while a user is operating the operation panel of a multifunction printer capable of a voice notification, the multifunction printer does not perform the voice notification in principle. After the operation ends, the multifunction printer performs the voice notification of the completion of printing.

To address Issue 1 above, a voice notification for a remote job is not performed while a user is operating the multifunction printer. The voice notification for the remote job is delayed until the operation by the user ends.

Further, assume a case where user authentication has been performed. If the remote job is a job for the user operating the operation panel, the voice notification is immediately performed. If the remote job is not a job for the user operating the operation panel, the voice notification is delayed.

To address issue 2, in not only a case for a remote job but also any of the following cases: at any time, a case where the operation panel is operated for a long time, and a case where the multifunction printer receives a request for a voice notification from an external apparatus such as a personal computer, the voice notification of the availability of the multifunction printer may be performed after the operation of the multifunction printer ends.

First Embodiment

Figure 1:
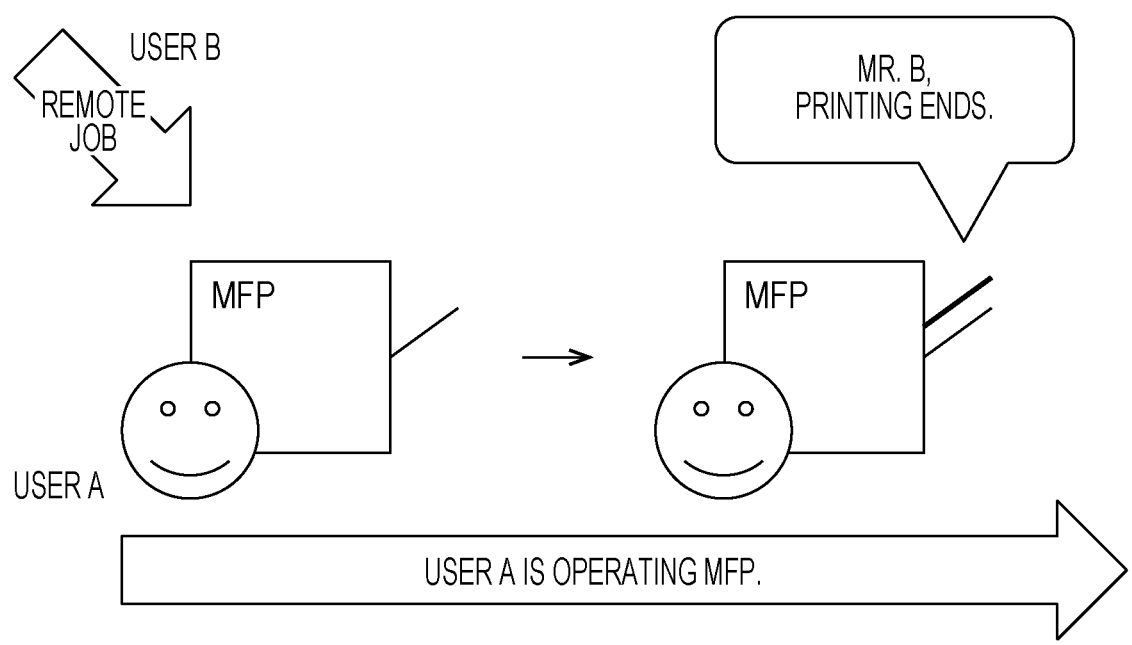
FIG. 1 is a conceptual diagram illustrating time when a voice notification in an example of the related art is performed.
Figure 2:
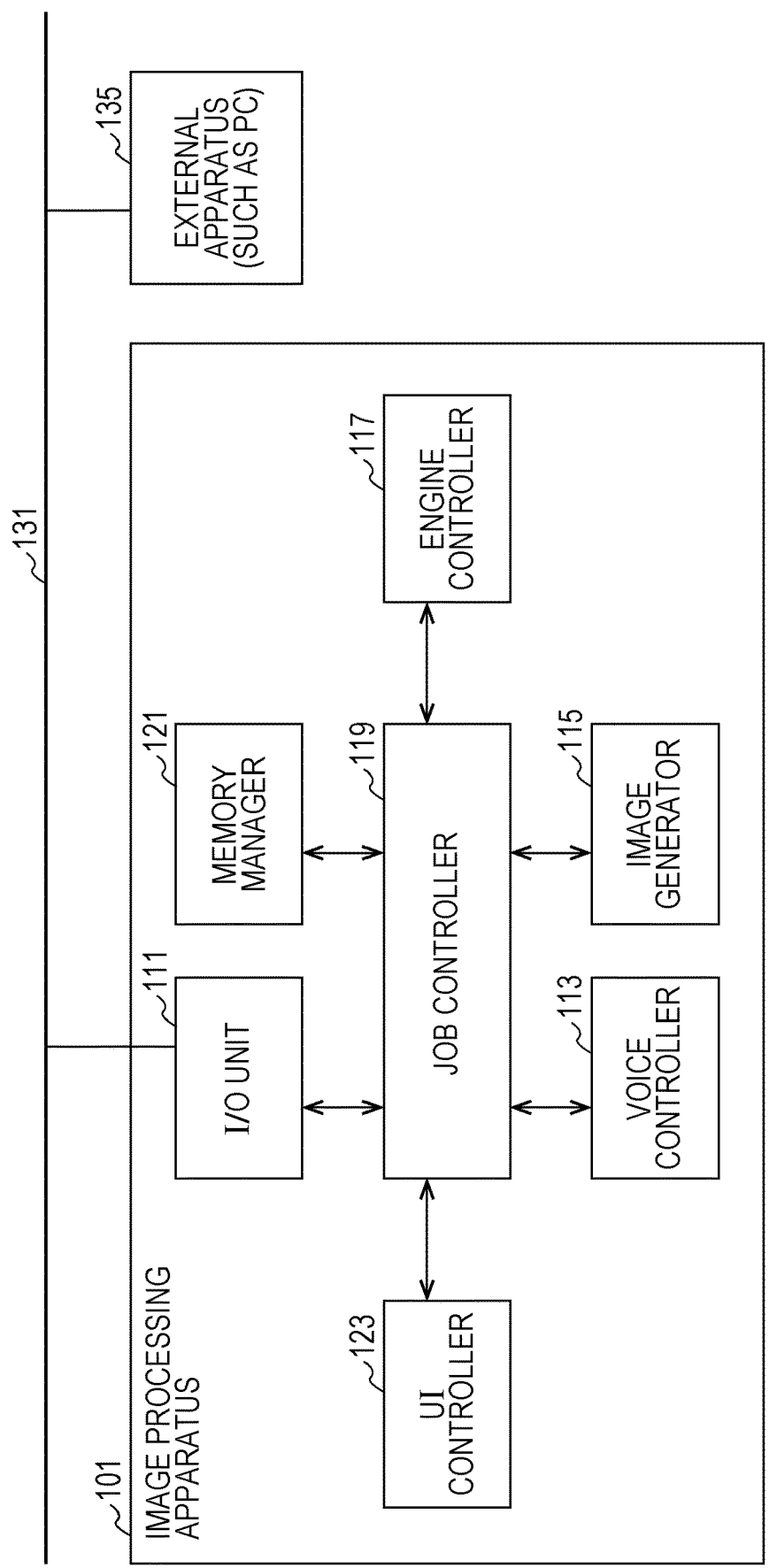
FIG. 2 is a schematic control block diagram of a printing system according to an embodiment of the disclosure.

FIG. 2 is a diagram illustrating an example configuration of a printing system according to an embodiment of the disclosure. The printing system includes an image processing apparatus 101 such as a multifunction printer and an external apparatus 135 such as a personal computer connected to the image processing apparatus 101 via a network 131. Although only one external apparatus 135 is illustrated in the example in FIG. 2, a plurality of external apparatuses 135 may be connected to the image processing apparatus 101.

The image processing apparatus 101 includes an input-output (I/O) unit 111, a voice controller 113, an image generator 115, an engine controller 117, a job controller 119, a memory manager 121, and a user interface (UI) controller 123.

The I/O unit 111 communicates with the external apparatus 135 such as the personal computer via the network 131, a universal serial bus (USB) (not illustrated), or the like.

The voice controller 113 determines when to perform a voice notification and performs the voice notification.

The image generator 115 analyzes printing information included in a job, thus analyzes data involved in printing, such as a job type, a designated number of prints, a sheet size, a sheet type, a designated tray, and generates image data to be used for the printing.

The engine controller 117 performs drive control of the engine for printing the image data.

The job controller 119 manages a job from the receiving of the job to the completion of printing.

The memory manager 121 includes a memory device such as a memory or a hard disk, stores the printing data involved in printing, such as image data and job information, and manages memory capacity including a work area.

The UI controller 123 controls message displaying and operation of the operation panel that is a UI, such as a touch panel.

The image processing apparatus 101 executes a remote job in response to a request from the external apparatus 135 such as the personal computer connected to the network 131. The image processing apparatus 101 executes an operator operation job in response to user operation of the operation panel or the like controlled by the UI controller 123.

Figure 3:
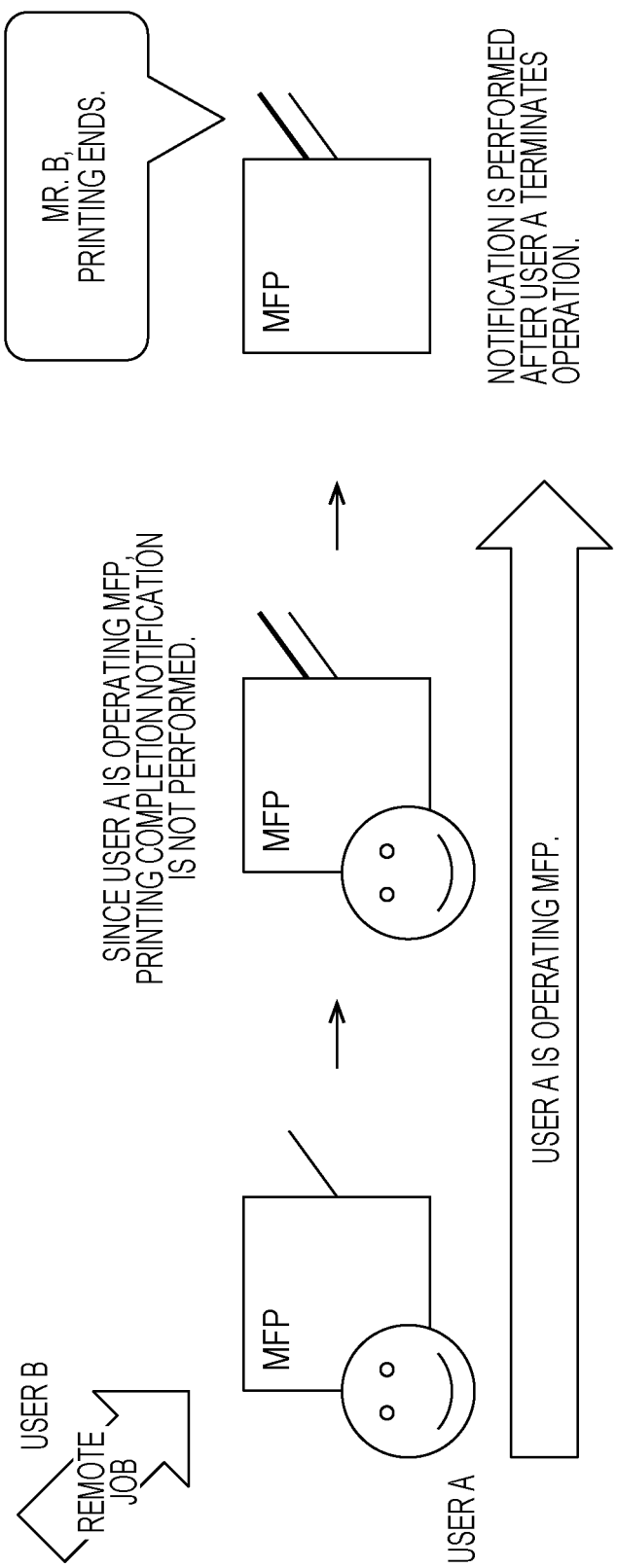
FIG. 3 is a conceptual diagram illustrating time when a voice notification according to the embodiment of the disclosure is performed.

FIG. 3 illustrates an example of time when a voice notification in this embodiment to address Issue 1 above is performed.

Assume a case where before or after the start of a period in which the multifunction printer executes an operator operation job such as copying or scanning in response to operation of the multifunction printer by the user A, the multifunction printer executes a remote job in at least part of the period in response to a request from the user B. In this case, if the remote job is complete before the operator operation job ends, a voice notification for the user B is not performed when the remote job for the user B is complete. The voice notification is performed when a series of predetermined processes related to the operator operation job for the user A is complete.

Note that instead of the time when the series of predetermined processes related to the operator operation job for the user A is complete, the voice notification for the user B may be performed when operation by the user A ends, when the user A logs off, or when a human sensor no longer detects the user A. The time when the series of predetermined processes related to the operator operation job for the user A is complete is, for example, time when discharging a paper sheet printed by copying ends or time when a predetermined step for facsimile transmission ends. The time when the operation by the user A ends is, for example, time when a series of operations for copying is complete, time when a series of operations of transmission buttons for facsimile transmission is complete, or time when a series of operations for scanning is complete. When the series of predetermined operations related to any of these operator operation jobs is complete, the voice notification for the user B may be performed. Hereinafter, the phrase "time when a series of predetermined processes related to an operator operation job for a user is complete" includes the phrase "time when a series of predetermined operations related to an operator operation job for a user is complete".

If a user authentication function is enabled, whether the user A and the user B are the same user may be determined. Accordingly, in a case where they are determined as the same user, the voice notification is not delayed, and the completion notification is performed even during the operation. For example, the completion notification is performed in a case where an operator operation job and a remote job from the same user are executed in parallel, such as a case where while a user performs an operation for scanning 100 sheets, they request execution of a different printing job from a personal computer.

Figure 4:
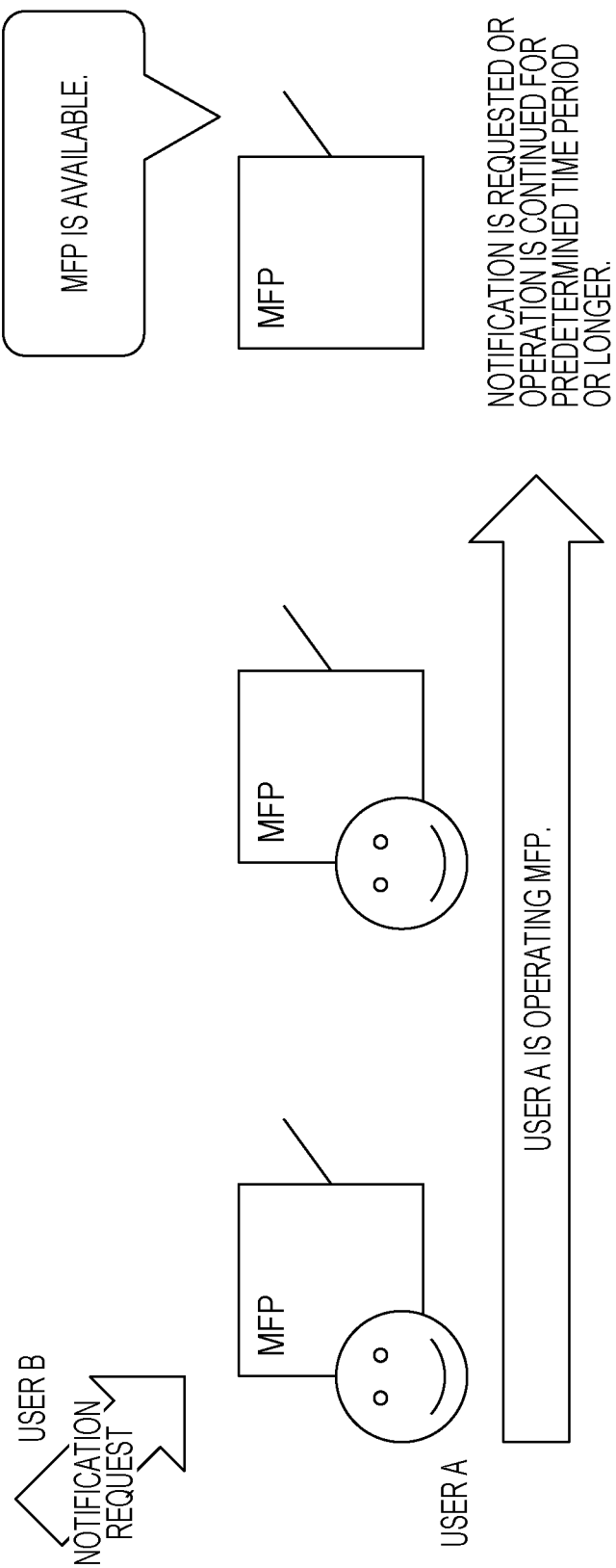
FIG. 4 is a conceptual diagram illustrating a voice notification according to the embodiment of the disclosure and in response to a use-condition notification request.

FIG. 4 illustrates an example of time when a voice notification in this embodiment to address Issue 2 is performed.

Assume a case where in a period in which the multifunction printer executes an operator operation job such as copying or scanning in response to operation of the multifunction printer by the user A, the user B requests the multifunction printer to notify the user B of the use condition of the multifunction printer. In this case, a voice notification for the user B may be performed when a series of predetermined processes related to the operator operation job for the user A is complete.

Note that instead of the time when the series of predetermined processes related to the operator operation job for the user A is complete, the voice notification for the user B may be performed when operation by the user A ends, when the user A logs off, or when a human sensor no longer detects the user A. The examples of the time when the series of predetermined processes related to the operator operation job for the user A is complete and the time when the operation by the user A ends have been described as above.

In not only a case where a user requests a notification but also a case where, for example, a user continues operating the multifunction printer for a predetermined time period or longer, a voice notification may be performed. The voice notification is performed even if there is no request because it is highly likely that a different user waits for a state where the multifunction printer becomes available.

Figure 5:
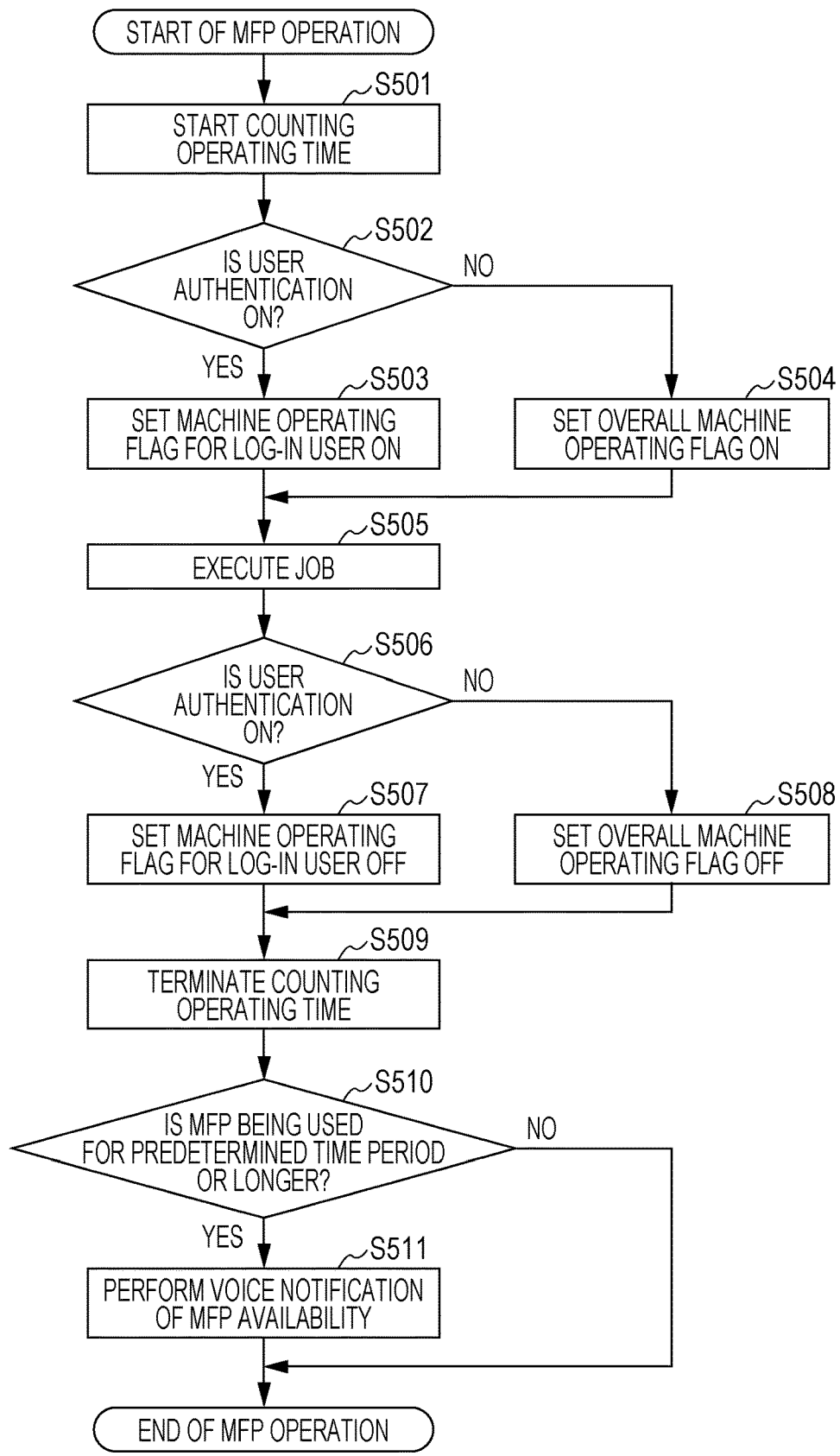
FIG. 5 is a flowchart illustrating a multifunction printer operation process according to the embodiment of the disclosure.

FIG. 5 is a flowchart illustrating a process executed when the multifunction printer is operated.

After a user starts operating the operation panel, counting operating time is started from zero (S501). If the multifunction printer operates with user authentication being ON (YES in S502), a machine operating flag for the user who logs in is set ON, and the currently operating state of the multifunction printer is stored (S503). If the multifunction printer operates with the user authentication being OFF (NO in S502), an overall machine operating flag is set ON, and the currently operating state of the multifunction printer is stored (S504).

A job is executed (S505). While the job is being executed, the machine operating flag is ON. The same holds true for a case where the job is complete without performing any operation.

If the multifunction printer operates with the user authentication being ON after the completion of the job (YES in S506), the machine operating flag for the user who logs in is set OFF, and the termination state of the multifunction printer operation is stored (S507). If the multifunction printer operates with the user authentication being OFF (NO in S506), the overall machine operating flag is set OFF, and the termination state of the multifunction printer operation is stored (S508).

Counting the machine operating time is terminated (S509). If it is determined based on the counting after the end of the operation that the use of the multifunction printer is continued for a predetermined time period or longer (YES in S510), a voice notification indicating that the multifunction printer is available is performed (S511). If it is determined that the use is continued for the predetermined time period or shorter (NO in S510), the process is terminated without the voice notification. The user may set any predetermined time period.

The reason why the notification is performed only if the use is continued for the predetermined time period or longer is that more users are likely to wish to know the availability as a longer time elapses.

Figure 6:
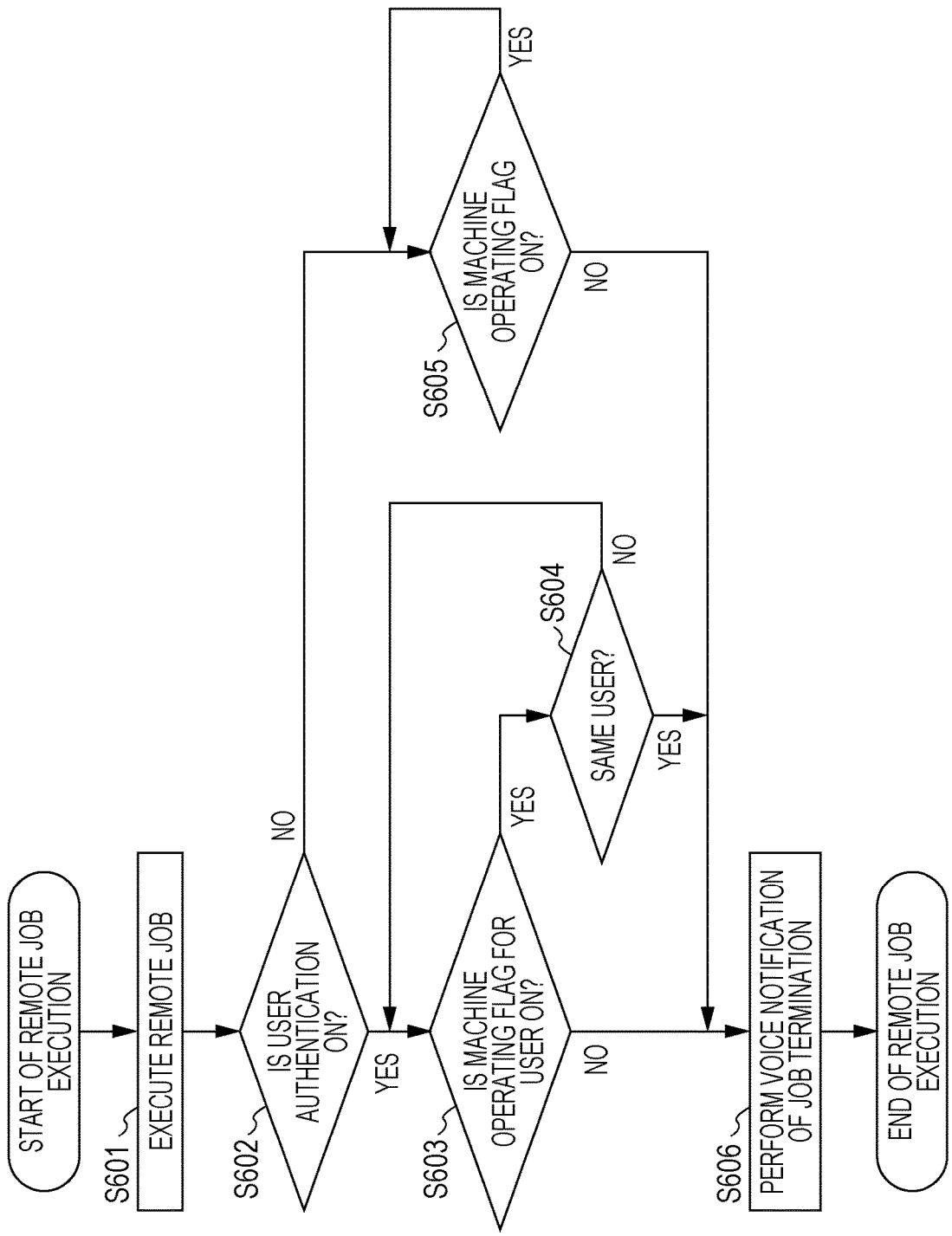
FIG. 6 is a flowchart illustrating a remote-job execution process according to the embodiment of the disclosure.

FIG. 6 is a flowchart of a voice notification of the completion of a remote job.

The multifunction printer receives a request for a remote job and executes the remote job (S601).

If the multifunction printer operates with the user authentication being ON after the completion of the remote job (YES in S602), the machine operating flag for the authenticated user is checked. If the machine operating flag is OFF (NO in S603), a voice notification of the job completion is performed without performing any other steps (S606). If the machine operating flag for the user is ON (YES in S603), whether the user operating the multifunction printer and a user for the remote job are the same user is checked (S604). If the multifunction printer is being used by the same user (YES in S604), the voice notification of the job completion is performed (S606). If the multifunction printer is not being used by the same user, waiting is performed until the machine operating flag for the user becomes OFF (NO in S604). If the machine operating flag becomes OFF (NO in S603), the voice notification of the job completion is performed (S606).

If the multifunction printer operates with the user authentication being OFF (NO in S602), the overall machine operating flag is checked. If the overall machine operating flag is OFF (NO in S605), the voice notification of the job completion is performed without performing any other steps (S606). If the overall machine operating flag is ON (YES in S605), waiting is performed until the overall machine operating flag becomes OFF (YES in S605). If the overall machine operating flag becomes OFF (NO in S605), the voice notification of the job completion is performed (S606).

Figure 7:
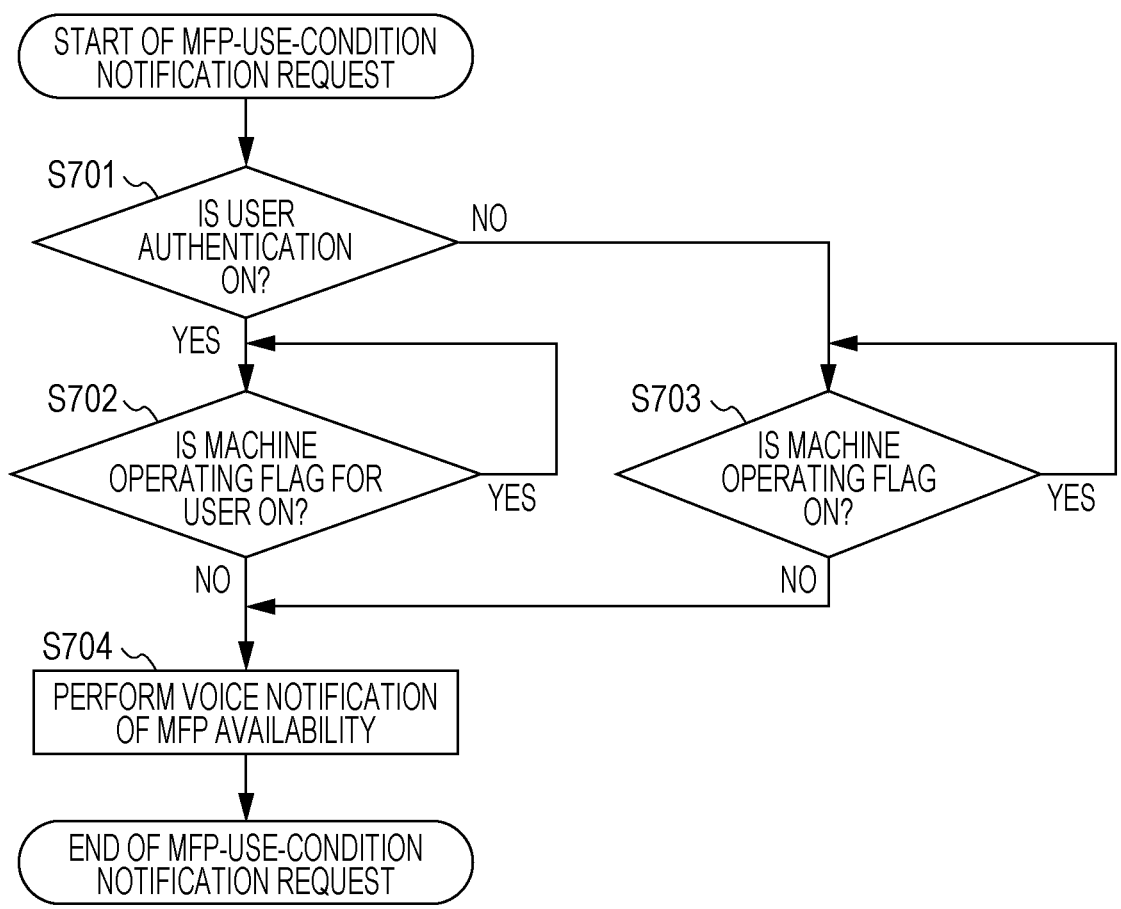
FIG. 7 is a flowchart illustrating a use-condition notification request process according to the embodiment of the disclosure.

FIG. 7 is a flowchart of a voice notification of the completion of a series of predetermined processes related to an operator operation job executed in response to a use-condition notification request to the multifunction printer.

If the multifunction printer operates with the user authentication being ON when a use-condition notification request to the multifunction printer is received (YES in S701), the machine operating flag for a user is checked, and thereby whether a user having the machine operating flag ON is present is checked (S702). If a user having the machine operating flag ON is not present (NO in S702), a voice notification indicating that the multifunction printer is available is performed (S704). If the user having the machine operating flag ON is present (YES in S702), waiting is performed until the machine operating flag for the user becomes OFF (NO in S702). The voice notification indicating that the multifunction printer is available is thereafter performed (S704).

If the multifunction printer operates with the user authentication being OFF (NO in S701), the overall machine operating flag is checked. If the overall machine operating flag is OFF (NO in S703), the voice notification indicating that the multifunction printer is available is performed (S704). If the overall machine operating flag is ON (YES in S703), waiting is performed until the overall machine operating flag becomes OFF (YES in S703). If the machine operating flag becomes OFF (NO in S703), the voice notification indicating that the multifunction printer is available is performed (S704).

Note that an operator operation job is taken as a representative of jobs other than a remote job; however, a job regarded as neither the operator operation job nor the remote job may be handled in the same manner as for the operator operation job.

The methods described with reference to FIGS. 5 to 7 are performed inside the image processing apparatus 101 illustrated in FIG. 2. The voice controller 113 particularly performs each method in such a manner as to communicate with other components. Components related to the method among components of the image processing apparatus 101 constitute a job completion notification apparatus.

Figure 8:
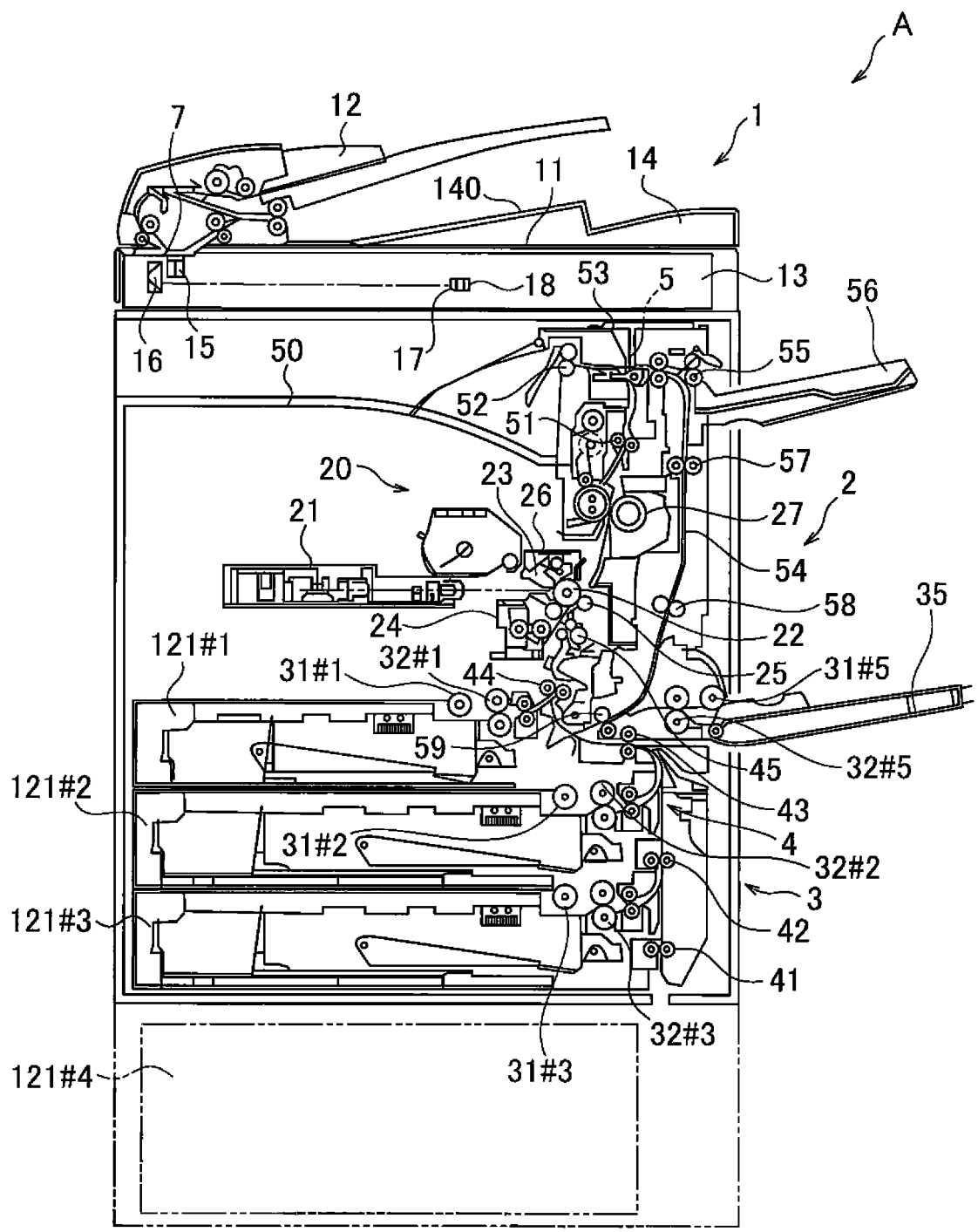
FIG. 8 is a schematic cross-sectional diagram of the multifunction printer according to the embodiment of the disclosure.

FIG. 8 is a lengthwise sectional view illustrating the configuration of an image forming apparatus A. As illustrated in FIG. 8, an image reading apparatus (an image reader) 1 includes a platen glass 11 made of transparent glass, automatic document feeder capable of duplex reading (RADF) 12 for reading a document image while feeding a document, and a document reading apparatus, that is, a document scanner unit 13, for scanning and reading an image of a document placed on the platen glass 11.

The RADF 12 is a publicly known apparatus that automatically feeds a plurality of documents collectively set on a predetermined document tray. The RADF 12 feeds the documents one by one to an automatically-fed-document reader on the platen glass 11 of the document scanner unit 13. The RADF 12 includes a transportation path for a single-sided document, a transportation path for a two-sided document, a transportation path switching unit, and the like to cause the document scanner unit 13 to read one side or two sides of a document in accordance with the selection of a user. When the RADF 12 is used to read document images, a first scanning unit 15 and a second scanning unit 16 (each of which will be described later) included in the document scanner unit 13 stand still in the automatically-fed-document reader disposed in a side portion of the document scanner unit 13 and on the platen glass 11, and images of documents passing through the automatically-fed-document reader are serially read. FIG. 8 illustrates a state in which the first scanning unit 15 and the second scanning unit 16 stand still in the automatically-fed-document reader. The RADF 12 is provided integrally into or separately from a document cover 14 placed over the platen glass 11 so as to be openable. The document cover 14 is used to press a document placed on the platen glass 11 against the platen glass 11 to avoid floating of the document. The upper surface of the document cover 14 serves as an exit tray 140 for the automatically fed document.

The document scanner unit 13 includes a lamp reflector assembly, the first scanning unit 15, the second scanning unit 16, and an optical lens body 17. The lamp reflector assembly exposes a surface or the document to light. The first scanning unit 15 has a first reflection mirror for guiding an image based on light reflected from the document to a photoelectric conversion element (for example, a charge coupled device (CCD) or a contact image sensor (CIS)) 18 that serves as an image detector and that converts the image to an electrical image signal. The second scanning unit 16 has second and third reflection mirrors. The optical lens body 17 is used to form the reflected light image on the photoelectric conversion element 18. The first scanning unit 15 has a document irradiation light source 7 (described later). Scanning is controlled such that the first scanning unit 15 travels on the platen glass 11 from the left to the right in FIG. 8 at a fixed velocity V and the second scanning unit 16 travels in the same direction at ½ of the fixed velocity V. In the image reader 1, the documents to be read are placed on the platen glass 11 serially. Meanwhile, the document scanner unit 13 is moved on the lower surface of the platen glass 11, the image of each document placed on the platen glass 11 is formed serially line by line on the photoelectric conversion element 18, and thereby the document image is read.

After undergoing various processes, image data obtained by reading the document image by the document scanner unit 13 is temporarily stored in the memory, output from the memory to an image recorder 2 in response to an output instruction, and reproduced as a visible image on a photoconductor drum 22. The image is thereafter transferred onto sheet (recording medium), and a toner image is thereby formed. The image recorder 2 includes a laser scanning unit (LSU) 21 and an electrophotographic processor 20 for forming an image. The laser scanning unit 21 includes semiconductor laser, a polygon mirror, an f-θ lens, and other components. The semiconductor laser emits a laser beam in accordance with the image data read from the memory or image data transferred from an external apparatus such as a personal computer. The polygon mirror deflects the laser beam at uniform angular velocity. The f-θ lens performs correction such that the photoconductor drum 22 of the electrophotographic processor 20 is scanned at uniform velocity with the laser beam deflected at the uniform angular velocity. The electrophotographic processor 20 includes a charger 23, a developer 24, a transfer device 25, and a cleaner 26 that are arranged in a known manner around the photoconductor drum 22. The electrophotographic processor 20 further includes a fuser 27 disposed downstream of the photoconductor drum 22.

A feed unit (recording-medium supply unit) 3 has first to third cassettes 121#1 to 121#3 allowing a large number of sheets to be stacked therein and a manual feed tray 35. Pickup rollers 31#1 to 31#3 and 31#5 that feed the uppermost sheet of the stacked sheets one by one are each installed at the front end in a feeding direction of a corresponding one of the first to third cassettes 121##1 to 121#3 and the manual feed tray 35. Feed rollers 32#1 to 32#3 and 32#5 are installed nearby and downstream in the feeding direction. Parts downstream of the feed rollers 32#1 to 32#3 and 32#5 in the feeding direction meet each other to form a feed and transportation unit 4. The feed and transportation unit 4 has transportation rollers 41, 42, 43, and 44 and registration rollers 45. A sheet fed from one of the first to third cassettes 121#1 to 121#3 and the manual feed tray 35 goes through the corresponding transportation rollers 41, 42, or 43 and the transportation rollers 44 and reaches the registration rollers 45. The sheet undergoes registration by the registration rollers 45 and is transported to the transfer position between the photoconductor drum 22 and the transfer device 25.

In FIG. 8, as illustrated by long-dashed double-dotted line, a large-capacity cassette 121#4 as an optional cassette is installed as a fourth cassette under the third cassette 121#3. The feed and transportation unit 4 is also connected to the feeding side of the large-capacity cassette 121#4, and a sheet fed from the large-capacity cassette 121#4 is transported by the transportation rollers 41 toward the transfer position. That is, sheets are stacked and accommodated in accordance with sizes in the first to fourth cassettes 121#1 to 121#4 in the feed unit 3. When a cassette or the manual feed tray 35 accommodating sheets of a desired size is selected by a user or automatically selected based on size information regarding image data to be recorded, sheets are fed serially one by one from the uppermost sheet of the bundle of sheets in the selected tray and transported toward the electrophotographic processor 20 via the transportation path of the feed and transportation unit 4. The transportation path of the feed and transportation unit 4 extends to the fuser 27 via the transfer position, and a discharge path 5 is provided downstream of the fuser 27 in a sheet transportation direction.

In the laser scanning unit 21 and the electrophotographic processor 20, based on the image data read from the memory or the image data transferred from the external apparatus such as the personal computer, an electrostatic latent image is formed on the surface of the photoconductor drum 22 in such a manner that the laser scanning unit 21 performs scanning with the laser beam. The transfer device 25 electrostatically transfers the toner image visualized with the toner of the developer 24 onto the surface of the sheet fed and transported from the feed unit 3, and the fuser 27 fixes the transferred image. The sheet having the image formed thereon in this manner is transported from the fuser 27 to a stacking tray 50 via transportation rollers 51 and discharge rollers 52 capable of forward and reverse rotations. The transportation rollers 51 and the discharge rollers 52 are disposed on the discharge path 5. A switch gate 53 is disposed on the discharge path 5 and between the transportation rollers 51 and the discharge rollers 52. A re-feeder and re-transporter 54 that extends from the switch gate 53 and joins the feed and transportation unit 4 upstream of the transportation rollers 44 is connected to the switch gate 53.

The sheet having the image recorded thereon is transported further upwards by the transportation rollers 51 via the fuser 27 and passes through the switch gate 53. If the stacking tray 50 is set as the transportation destination of the sheet, the sheet is discharged to the stacking tray 50 through forward rotation of the discharge rollers 52. In contrast, if duplex image formation or post-processing is designated, the sheet is temporarily discharged toward the stacking tray 50 by the discharge rollers 52. Note that in this case, the sheet is not completely discharged, the discharge rollers 52 are stopped once to hold the trailing edge of the sheet between the discharge rollers 52 and thereafter are rotated in a reverse direction. The sheet is thereby reversed and transported in the reverse direction, that is, toward the re-feeder and re-transporter 54 selectively attached for the duplex image formation or the post-processing. At this time, the switch gate 53 is switched from upward facing to downward facing. A switch gate 55 for the post-processing (such as stapling or punching) is provided in the re-feeder and re-transporter 54. When a post-processing mode is selected, the reversed and transported sheet is transported to a post-processing part by switching the switch gate 55, undergoes a stapling or punching process, and thereafter is discharged to a post-processing tray 56. If duplex image recording is performed, the reversed and transported sheet is transported by transportation rollers 57, 58, and 59 disposed in the re-feeder and re-transporter 54, passes through the re-feeder and re-transporter 54, is supplied to the transfer position of the image recorder 2 again via the registration rollers 45, and undergoes image recording on the back surface of the sheet.

Note that the job completion notification apparatus described above may be implemented by hardware, software, or combination of these. In addition, each job completion notification method per by the job completion notification apparatus described above may be implemented by hardware, software, or combination of these. Implementing by software denotes implementing in such a manner that a computer reads a program and runs the program.

The program may be stored in any of various types of non-transitory computer readable media and thereby be supplied to the computer. The non-transitory computer readable media include various types of tangible storage media. Examples of the non-transitory computer readable media include a magnetic recording medium (for example, a flexible disk, a magnetic tape, or a hard disk drive), a magneto-optical recording medium (for example, a magneto-optical disk), a compact disc read only memory (CD-ROM), a CD recordable (CD-R), a CD rewritable (CD-R/W), and a semiconductor memory (for example, a mask ROM, a programmable ROM (PROM), an erasable PROM (EPROM), a flash ROM, or a random access memory (RAM)). The program may also be supplied to the computer with any of various types of transitory computer readable media. Examples of the transitory computer readable media include an electric signal, an optical signal, and an electromagnetic wave. The transitory computer readable media may be used to supply the program to the computer via a wired channel such as an electric wire or an optical fiber cable or a wireless channel.

The disclosure may be implemented in other various types of modes without departing from the spirit or the major characteristics of the disclosure. The embodiment described above is thus provided only for illustrative purpose and is not to be construed as a limitation. The scope of the disclosure is represented by the scope of claims, and there is no intention to be bound by what is described herein. Further, all of modifications and alternations made in the equivalents of the scope of claims are within the scope of the disclosure.

INDUSTRIAL APPLICABILITY

The disclosure is usable for timing control for a job completion notification.

The present disclosure contains subject matter related to that disclosed in Japanese Priority Patent Application JP 2018-009484 filed in the Japan Patent Office on Jan. 24, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A multifunction printer that executes an operator operation job and a remote job, the operator operation job being a job executed in response to input performed on the multifunction printer by an operator, the remote job being a job executed in response to a job request from an external apparatus connected to the multifunction printer via a network, wherein
if the remote job is complete during a processing time period of executing the operator operation job, the multifunction printer performs a voice notification after an expiry of the processing time period so that a series of predetermined processes related to the operator operation job is complete, the voice notification indicating that the remote job is complete.

2. The multifunction printer according to claim 1, wherein
if runtime of the operator operation job is longer than or equal to a predetermined time period, the multifunction printer performs a voice notification indicating that the series of predetermined processes related to the operator operation job is complete, the voice notification being performed when the series of predetermined processes related to the operator operation job is complete.

3. The multifunction printer according to claim 2, wherein
if the multifunction printer receives, from the external apparatus, a request for the voice notification indicating that the series of predetermined processes related to the operator operation job is complete, the multifunction printer performs the voice notification indicating that the series of predetermined processes related to the operator operation job is complete, the voice notification being performed when the series of predetermined processes related to the operator operation job is complete.

4. The multifunction printer according to claim 1, wherein
if the multifunction printer receives, from the external apparatus, a request for a voice notification indicating that the series of predetermined processes related to the operator operation job is complete, the multifunction printer performs the voice notification indicating that the series of predetermined processes related to the operator operation job is complete, the voice notification being performed when the series of predetermined processes related to the operator operation job is complete.

5. A non-transitory computer readable medium storing a program causing a computer to function as the multifunction printer according to claim 1.

6. A multifunction printer that executes an operator operation job and a remote job, the operator operation job being a job executed in response to input performed on the multifunction printer by an operator, the remote job being a job executed in response to a job request from an external apparatus connected to the multifunction printer via a network, wherein if the remote job is complete while the multifunction printer is executing the operator operation job, the multifunction printer compares the operator corresponding to the operator operation job with a requester corresponding to the remote job and performs a voice notification indicating that the remote job is complete, the voice notification being performed immediately if the operator is identical to the requester, the voice notification being performed after a series of predetermined processes related to the operator operation job is complete if the operator is not identical to the requester.

7. A job completion notification method for a multifunction printer that executes an operator operation job and a remote job, the operator operation job being a job executed in response to input performed on the multifunction printer by an operator, the remote job being a job executed in response to a job request from an external apparatus connected to the multifunction printer via a network, the method comprising:

performing a voice notification if the remote job is complete during a processing time period of executing the operator operation job, the voice notification indicating that the remote job is complete, the voice notification being performed after an expiry of the processing time period so that a series of predetermined processes related to the operator operation job is complete.

8. A job completion notification method for a multifunction printer that executes an operator operation job and a remote job, the operator operation job being a job executed in response to input performed on the multifunction printer by an operator, the remote job being a job executed in response to a job request from an external apparatus connected to the multifunction printer via a network, the method comprising:

if the remote job is complete while the multifunction printer is executing the operator operation job, comparing the operator corresponding to the operator operation job with a requester corresponding to the remote job and performing a voice notification indicating that the remote job is complete, the voice notification being performed immediately if the operator is identical to the requester, the voice notification being performed after a series of predetermined processes related to the operator operation job is complete if the operator is not identical to the requester.

* * * * *